US009561605B2

(12) United States Patent
Badin (10) Patent No.: US 9,561,605 B2
(45) Date of Patent: Feb. 7, 2017

(54) STRUCTURAL ELEMENT FOR THE BUILDING TRADE, MACHINE AND METHOD TO MAKE IT

(71) Applicant: S.A.C.M.E. SRL, Azzano Decimo (pn) (IT)

(72) Inventor: Luciano Badin, Azzano Decimo (IT)

(73) Assignee: S.A.C.M.E. SRL, Azzano Decimo (IT)

( * ) Notice: Subject to any disclaimer, the term of this patent is extended or adjusted under 35 U.S.C. 154(b) by 281 days.

(21) Appl. No.: 14/022,358

(22) Filed: Sep. 10, 2013

(65) Prior Publication Data

US 2014/0008840 A1 Jan. 9, 2014

Related U.S. Application Data

(62) Division of application No. 12/469,735, filed on May 21, 2009, now Pat. No. 8,549,808.

(30) Foreign Application Priority Data

May 23, 2008 (IT) .............................. UD2008A0117

(51) Int. Cl.
*B29C 39/10* (2006.01)
*B28B 1/08* (2006.01)
(Continued)

(52) U.S. Cl.
CPC ................ *B29C 39/10* (2013.01); *B28B 1/08* (2013.01); *B28B 13/023* (2013.01);
(Continued)

(58) Field of Classification Search
CPC .. B29C 39/10; B28B 13/0295; B28B 23/0056; B28B 1/08; B28B 19/003; B28B 13/023; B28B 15/005
(Continued)

(56) References Cited

U.S. PATENT DOCUMENTS 860,927 A 7/1907 Mann
1,080,367 A 12/1913 Raftis
(Continued)

FOREIGN PATENT DOCUMENTS

CA 1 149 189 A1 7/1983
DE 17 59 181 A1 3/1972
(Continued)

OTHER PUBLICATIONS

European Search Report, dated Mar. 11, 2010, in European Patent Application No. 09 16 0899.
(Continued)

*Primary Examiner* — Nahida Sultana
(74) *Attorney, Agent, or Firm* — Panitch Schwarze Belisario & Nadel LLP (57) ABSTRACT

A construction block or suchlike comprises at least one part made of conglomerate material, to which an insert made of filling material is constrained, to define a connection face for connection to another structural element. The connection face has visible a first surface of the insert and at least a connected second surface of the part made of conglomerate material. On the connection face other structural element(s) are combined, along a support plane (R, R1, R2) provided in correspondence with the connection face, to be stably connected by a layer of binder material. The second surface has a seating made longitudinally and lowered with respect to the support plane (R, R1, R2), on which seating the layer of binder material is located. The seating has a determinate depth (D), with respect to the support plane (R, R1, R2) correlated to the predefined thickness of the binder material to be laid.

27 Claims, 10 Drawing Sheets

(51) Int. Cl.
  *B28B 13/02* (2006.01)
  *B28B 15/00* (2006.01)
  *B28B 19/00* (2006.01)
  *B28B 23/00* (2006.01)
  *E04C 1/41* (2006.01)
  *E04B 2/02* (2006.01)

(52) U.S. Cl.
  CPC ........ *B28B 13/0295* (2013.01); *B28B 15/005* (2013.01); *B28B 19/003* (2013.01); *B28B 23/0056* (2013.01); *E04C 1/41* (2013.01); *E04B 2002/0284* (2013.01)

(58) Field of Classification Search
  USPC ............... 264/277, 228, 299; 425/324.1, 110
  See application file for complete search history.

(56) References Cited

U.S. PATENT DOCUMENTS

| | | | |
|---|---|---|---|
| 1,188,919 A | 6/1916 | England | |
| 1,751,272 A | 3/1930 | Forman | |
| 1,892,605 A | 12/1932 | Betzler | |
| 2,825,954 A * | 3/1958 | Ripley | B28B 5/04 425/324.1 |
| 4,190,995 A | 3/1980 | Armistead | |
| 4,285,181 A | 8/1981 | Van Loghem et al. | |
| 4,348,845 A | 9/1982 | Iannarelli | |
| 4,380,887 A | 4/1983 | Lee | |
| 4,478,021 A | 10/1984 | Person | |
| 4,551,959 A | 11/1985 | Schmid | |
| 4,698,949 A | 10/1987 | Dietrich | |
| 4,854,097 A | 8/1989 | Haener | |
| 5,209,037 A | 5/1993 | Kennedy et al. | |
| 5,281,125 A * | 1/1994 | Gebhardt | B28B 3/022 425/253 |
| 5,321,926 A | 6/1994 | Kennedy | |
| 5,339,592 A | 8/1994 | Schmid | |
| 5,349,798 A | 9/1994 | Gross | |
| 5,878,545 A | 3/1999 | Gebhart | |
| 6,134,853 A | 10/2000 | Haener | |
| 6,305,135 B1 | 10/2001 | Inaba | |
| 6,513,293 B2 | 2/2003 | Miller | |
| 6,913,717 B2 * | 7/2005 | Sayadi | E01B 1/002 238/5 |
| 2003/0038398 A1 * | 2/2003 | Ohta | B28B 23/06 264/228 |
| 2004/0050045 A1 * | 3/2004 | Bishop | B60T 13/588 60/545 |
| 2008/0066412 A1 | 3/2008 | Franco et al. | |
| 2008/0104916 A1 | 5/2008 | Schmid | |
| 2008/0236081 A1 | 10/2008 | Kennedy | |
| 2008/0260883 A1 * | 10/2008 | Toncelli | B28B 3/022 425/88 |
| 2009/0288361 A1 | 11/2009 | Badin et al. | |

FOREIGN PATENT DOCUMENTS

| | | |
|---|---|---|
| DE | 20 33 082 A1 | 6/1972 |
| DE | 3530138 A1 | 2/1987 |
| DE | 103 61 460 A1 | 6/2005 |
| EP | 0 136 184 A2 | 4/1985 |
| EP | 174882 A1 | 3/1986 |
| FR | 1 508 279 A | 3/1968 |
| FR | 2 189 601 A1 | 1/1974 |
| IT | 2007 A 000130 | 8/2008 |
| WO | 2009/013289 A2 | 1/2009 |

OTHER PUBLICATIONS

U.S. Office Action issued May 24, 2012 in U.S. Appl. No. 12/469,735 by Badin.

Office Action issued Oct. 17, 2011 in U.S. Appl. No. 12/469,735 by Badin.

Office Action issued Oct. 3, 2012 in U.S. Appl. No. 12/469,735 by Badin.

* cited by examiner

STRUCTURAL ELEMENT FOR THE BUILDING TRADE, MACHINE AND METHOD TO MAKE IT

CROSS-REFERENCE TO RELATED APPLICATIONS

This application is a divisional of co-pending U.S. patent application Ser. No. 12/469,735, filed May 21, 2009, the disclosure of which is incorporated herein by reference.

BACKGROUND OF THE INVENTION

The present invention refers to a structural element for the building trade, and to one of its components, to the relative machine and the method to make it, such as for example a brick, a block, a panel, a floor or other similar artifacts made of conglomerate material, such as concrete, with a cement or other base, provided with one or more inserts made of insulating material, such as polystyrene, or similar heat/sound insulating materials or a filling material.

It is known to make construction blocks, consisting of two load-bearing parts made of concrete, one facing the outside and one the inside, and of one or more heat/sound insulating elements made of shaped polystyrene or a filling material, interposed between the two load-bearing parts.

Usually, the insulating or filling elements are made solid with the load-bearing parts by means of adhesives or other binding techniques. Examples of a machine and method to make such construction blocks can be found in patent application UD2007A0000130 filed in the name of the Applicant.

One disadvantage of known construction blocks is that they need particular and complicated strategies to lay the mortar, or other binder material, on the relative support planes of each block, to achieve a stable connection between one block and the other.

These strategies are, in particular, intended to prevent unwanted amounts of mortar from being deposited on the visible surfaces of the polystyrene insulating elements.

The intention in fact is to avoid creating heat bridges due to the positioning of the mortar upon the insulation, between the two parts of the concrete block, the internal and the external part, which would compromise the attempt to reduce the overall heat transmittance of the walls of the building between the inside and the outside.

Such strategies are achieved by putting a ribbon of material on the visible insulating parts in order to cover them and protect them from the mortar, by spreading the layer of mortar and subsequently removing the ribbon, so as to be able to locate the next construction block on the mortar. In this way there is no laying of the mortar on top of the insulation, but it is a complex, laborious and costly procedure.

Purpose of the present invention is to create a structural element, and relative machine and method to make it, formed from at least one part made of conglomerate material and from an insert made of insulating or filling material, constrained to each other, which allows easy installation, avoiding the formation of heat bridges due to the laying of mortar on top of the insulating elements.

The Applicant has devised, tested and embodied the present invention to overcome the shortcomings of the state of the art and to obtain these and other purposes and advantages.

BRIEF SUMMARY OF THE INVENTION

The present invention is set forth and characterized in the independent claims, while the dependent claims describe other characteristics of the invention or variants to the main inventive idea.

In accordance with the above purpose, a structural element according to the present invention is suitable for to be used as a brick, construction block, panel, floor or suchlike in the building trade.

The structural element comprises at least a part made of conglomerate material such as concrete or similar, to which an insert made of insulating material, such as a sound/heat insulator like polystyrene, or filling material, is constrained, so as to define peripherally at least a connection face for connection to another structural element.

The connection face has a first surface of the insert visible and at least a second connected surface of said at least one part made of conglomerate material.

On the connection face, one or more other structural elements are able to be combined, along a support plane provided in correspondence with said connection face, in order to be laid and stably connected by means of a layer of binder material such as mortar.

Here and in the following description, by mortar we mean a binder material for structural/construction elements formed by a mixture of an agglomerative material or binder (lime, cement) with a finely divided inert material (sand) and water, used as an essential constituent of building works.

As a conglomerate material a cement concrete conglomerate can be used, but also volcanic lapillus, tar concrete, or other similar materials.

According to a first feature of the present invention, the second surface has a seating made longitudinally and lowered with respect to said support plane, and the layer of binder material is located on said seating. The seating has a determinate depth, with respect to the support plane, which is correlated to the predefined thickness of the binder material to be laid.

The structural element according to the present invention, thanks to the lowered seating made on the upper face or to the lowered seatings according to the possible variants, which confines and contains the layer of binder material, substantially functioning as a housing channel, allows an easy laying without the binder material going on the surface of the insert, preventing the formation of heat bridges due to the positioning of mortar on top of the inserts.

Advantageously, the lowered seating is made from side to side along the whole length, or the height, according to the possible variants, of the structural element, so that the layer of binder material can be distributed all along the length or height, achieving the best possible binding.

According to a variant, said seating involves the whole width of the second surface.

Alternatively, said seating involves a part of the width of the second surface.

According to one form of embodiment, the first surface of the insert is on a level with the height of the relative support plane.

Typically, the structural element has a first connection face normally able to be disposed horizontally, so that another structural element can be combined above it, and second lateral connection faces, normally able to be disposed vertically, so that another structural element can be combined next or adjacent to it.

According to a variant, the structural element comprises at least two parts made of conglomerate material provided laterally, between which at least said insert is located and constrained.

In this variant, two lowered seatings are provided, or rather a seating for each of the two second upper surfaces of the two parts made of conglomerate material.

According to a variant of the structural element of the present invention, given that the insert is provided to extend along the longitudinal median axis of said upper face, the lowered seatings are made on one side and the other side of said longitudinal median axis.

Alternatively, the structural element is provided with two lateral inserts, between which said part made of conglomerate material is located and constrained.

Other variants and combinations of several parts made of conglomerate material coupled and alternated with several inserts are possible, for example with a "multi-layered sandwich" structure, according to the specific construction requirements.

According to a second feature of the present invention, the structural element has protruding elements made on the second surfaces of the parts made of conglomerate material, in correspondence with the periphery, or external edge, of the connection face, typically the horizontal face, which have a height which is level with the support plane.

According to this latter solution, the upward extension of the protruding elements is preferably equal to the value of the depth of the lowered seatings.

Particularly, the protruding elements make the walls which laterally delimit, toward the outside of the element in an opposite position to the insert, said lowered seatings, so that they are flush with the insert of insulating or filling material.

More precisely, the protruding elements can be disposed on the external side of the second surface, in correspondence with the maximum width of the structural element.

The protruding elements, being advantageously disposed on the periphery and therefore allowing a stable and balanced support of everything, allow the weight to be discharged, both of the structural element itself when it is resting on the ground with the upper face facing downward, and also of other structural elements located on top of it, not only on the insulating insert, but also on the surface of the peripheral protruding elements, uniformly distributing the loads and preventing the insulating insert from being misshapen or ruined.

The protruding elements, advantageously, also function as reference notches during the laying of the structural elements, allowing a precise alignment of the wall that is to be made.

According to a variant, the protruding elements are disposed on the external side of the upper surface or surfaces of the parts made of conglomerate material provided on the upper face of the structural element, in correspondence with the maximum width of the structural element itself.

According to one form of embodiment, the protruding elements are disposed according to a predetermined repeated geometry.

According to a variant, the protruding elements are disposed equidistant from each other.

According to another variant, the protruding elements are disposed in pairs close together, equidistant from other pairs of protruding elements.

According to another form of embodiment of the present invention, the insert and the parts made of conglomerate material have on the periphery a plurality of respective first and second anchoring ribs, for example swallow-tailed, T-shaped or other suitable shapes, able to cooperate with mating first and second longitudinal grooves disposed respectively on the faces of the parts made of conglomerate material and the insert, in order to achieve a constraint of the insert and the parts made of conglomerate material.

In this way a monolithic structural element is achieved that as a whole is load-bearing and resistant to loads.

According to a variant, the second ribs of the parts made of conglomerate material extend in height, remaining under the level of the support plane by a determinate amount.

In particular, the second ribs may extend as far as the bottom of the seatings so that the space affected by said seatings extends at least as far as the wall of the insert made of insulating or filling material.

According to a third feature, an insert made of insulating or filling material according to the present invention is able to be constrained to at least a part made of conglomerate material, such as concrete and suchlike, in order to achieve a structural element for use as a brick, construction block, panel, floor or suchlike in the building trade, as described above.

The insert is shaped so as to have an extension in height as far as the level of the support plane, so that there is on said second surface a longitudinal seating lowered with respect to the support plane.

The insert according to the present invention is provided on the periphery, on the internal or external walls, with a plurality of first anchoring ribs, and corresponding first longitudinal seatings able to cooperate respectively with mating second longitudinal grooves and second anchoring ribs provided on the part made of conglomerate material in order to achieve the constraint of the parts made of conglomerate material and the insert.

The present invention also concerns a machine for the production of structural elements for use as a brick, construction block, panel, floor or suchlike in the building trade, as described above.

The machine comprises at least a molding member, loading means to load said inserts, means to deposit said conglomerate material, and a leveling element able to be moved on a plane above said molding member so as to act, by means of a scraper edge, on said structural elements. The molding member is open at the upper part and said loading means and said deposit means are selectively positionable above said molding member, in order to load and deposit from above, respectively, said inserts and said conglomerate material, into said molding member, in order to achieve said structural elements.

The molding member and the scraper edge are shaped and configured so as to define, on said second surface of said part made of conglomerate material, a seating made longitudinally and lowered with respect to the support plane.

According to a variant, the machine comprises a thruster element disposed above the molding member and able to thrust said inserts from the top downward, from the loading means, inside said molding member.

The thruster element has a comb element which is shaped and configured so as to mold, in its downward movement, protruding elements made on the second surfaces of the parts made of conglomerate material, in correspondence with the periphery or outer edge of the connection face, typically the horizontal one, which protruding elements have a height such as to be level with the support plane.

A method according to the present invention is used for the production of structural elements for use as a brick, construction block, panel, floor or suchlike in the building trade, as described above.

The method according to the present invention provides a shaping step in which, by means of a molding member and a leveling element provided with a scraper edge, at least a seating made longitudinally and lowered with respect to the support plane is defined on said second surface of said part made of conglomerate material.

According to a variant, the method provides a thrust step, by means of a thruster member disposed above the molding member, in which said inserts are thrust from the top downward, from the loading means, inside said molding member, and, in the downward movement, structural elements are molded by means of a comb element of said thruster member, suitably shaped and configured; the protruding elements are made on the second surfaces of the parts made of conglomerate material, in correspondence with the periphery or external edge of the connection face, normally the horizontal one, and have a height such as to be level with the support plane.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
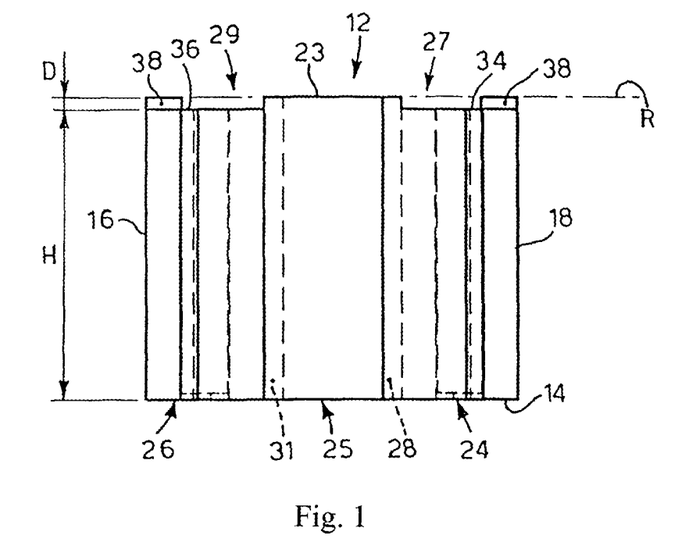
FIG. 1 is a front view of a structural element according to the present invention.

With reference to FIG. 1, a construction block 10 according to the present invention is formed by two parts 24, 26, made of conglomerate material, such as cement concrete, facing each other, between which an insert 25 made of insulating material is constrained, such as a panel made of heat/sound insulating polystyrene. It is also possible to use other polymers or other insulating materials, also of natural origin, such as wood, or simply filling materials.

The overall shape of the block 10 is traditional, that is, a rectangular parallelepiped, typical of bricks or construction blocks usually used in the building trade to make the walls of a building.

Both the parts 24, 26 made of conglomerate material, and also the insert 25 have first 28 and second 31 swallow-tailed ribs, which between them define respective and complementary first 30 and second 33 longitudinal grooves. Instead of the swallow-tailed section a T-shape could be used.

Figure 2:
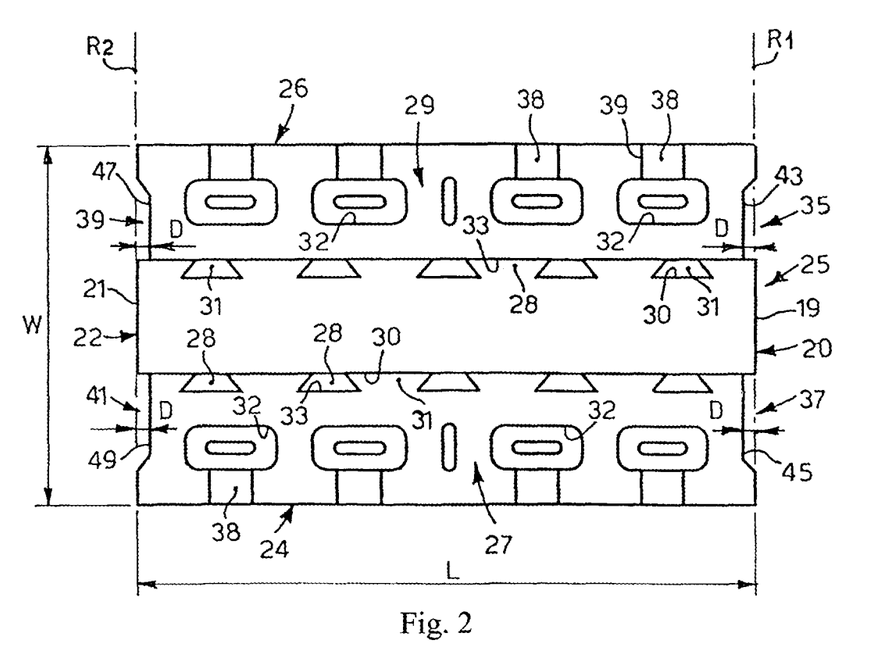
FIG. 2 is a plane view of the structural element in FIG. 1.
Figure 4:
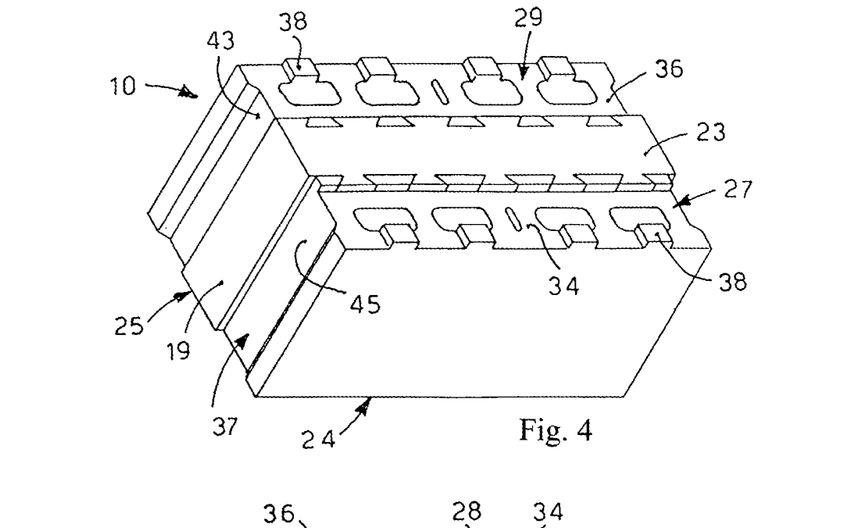
FIG. 4 is a three-dimensional view of the structural element in FIG. 1.

The parts 24 26 and the insert 25 are constrained together by coupling the first ribs 28 with the first grooves 30 of the parts 24, 26 and the corresponding coupling of the second ribs 31 with the second grooves 33 (FIGS. 2 and 4).

The block 10 is thus a monolithic structural body, having a structure that, all in all, is load-bearing, for the purposes of calculating resistance to loads, and not only the parts 24, 26 made of conglomerate material.

Figure 3:
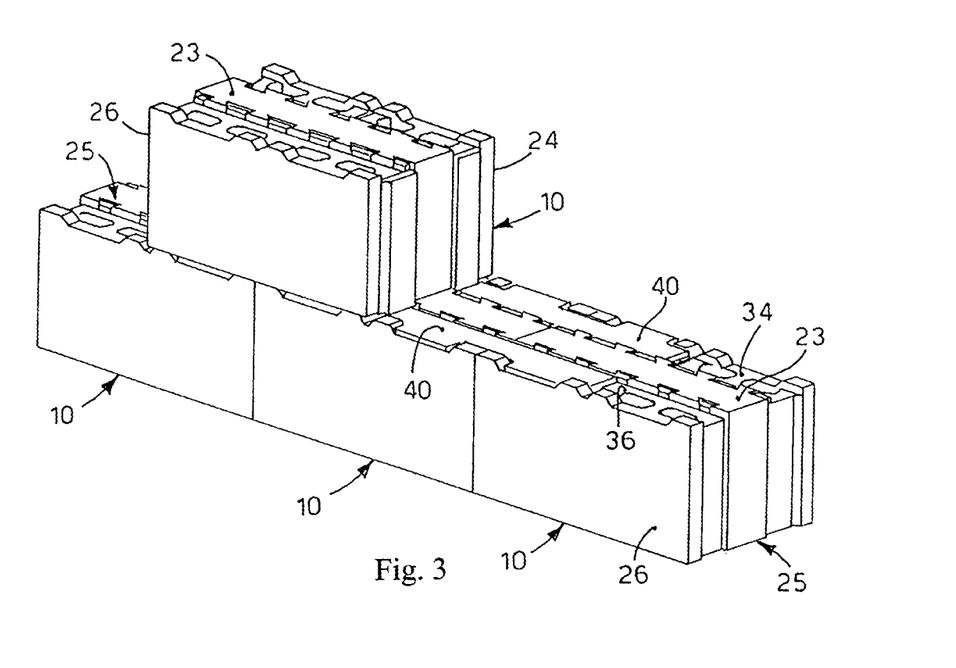
FIG. 3 is a perspective view of a plurality of structural elements according to the present invention, laid in making a wall.

The block 10 has six faces in all, 12, 14, 16, 18, 20, 22: three connection faces 12, 20, 22 for the stable connection with other blocks 10 so as to form a classic wall structure, as can be seen for example in FIG. 3.

In particular, there is an upper face 12, typically able to be disposed horizontal, and lateral faces 20, 22, on the right and left in FIG. 2, typically able to be disposed vertical.

The upper face 12 defines an upper support plane R, to allow the upper combination of a block 10.

The lateral faces 20, 22 define relative lateral support plane R1, R2, to allow the lateral combination of a relative block 10.

Furthermore, there are two front faces 16, 18, typically one able to face toward the inside of the building and the other toward the outside (FIGS. 1 and 2), and a lower face 14, which is normally located on other block 10.

In this case, the overall height H of the block 10 is 250 mm (calculated in correspondence with the support plane R), with a width W of 350 mm and a length of 500 mm.

A layer of mortar 40, laid on the upper face 12 and on the lateral faces 20, 22, determines a stable connection to the blocks 10 located above and at the side, when the wall is laid.

Through holes 32 are provided, transverse to the upper face 12, for the passage and accommodation of cables, pipes or other elements of the installation.

The upper face 12 is divided into a surface 23, in this case median, defined by the visible protrusion of the insert 25, and two surfaces 27, 29 defined by the parts 24, 26, as can be seen in FIGS. 1, 2 and 4.

The lateral faces 20, 22, in a similar way, have surfaces 19, 21, on the right and left in FIG. 2, located centrally and defined by the insert 25, and lateral surfaces 35, 37 and 39, 41, defined by the parts 24, 26.

As can be seen in FIGS. 1 and 3, both the surfaces 27, 29 of the upper face 12, and also the surfaces 35, 37 and 39, 41 of the lateral faces 20, 22 have respective lowered seatings 34, 36, 43, 45 and 47, 49, made longitudinally, for the whole length of the block 10, respectively on the parts 24 and 26, on the left and on the right of the insert 25 positioned between the parts 24 and 26.

In particular, with regard to the upper face 12, the surface 27 (on the right in FIG. 1) has its own upper seating 34 and the surface 29 (on the left in FIG. 1) has a relative upper seating 36.

On the contrary, considering the lateral face 20, its surface 35 has its own lateral seating 43 and the surface 37 has a relative lateral seating 45. In the same way, for the lateral face 22, the surface 39 has a lateral seating 47 and the surface 41 has a lateral seating 49.

According to a variant, it may be that only one of the two lateral faces 20 or 22 has the relative seatings 43, 45 or 47, 49, whereas the other lateral face is flat.

The lower face 14, instead, is in any case flat, that is, the insert 25 is flush with the two parts 24 and 26, as can be seen in FIG. 1.

The depth D of the lowered seatings 34, 36, 43, 45 and 47, 49 with respect to the associated support plane R, R1, R2 is directly correlated to the thickness of the layer of mortar 40 that is normally laid on the blocks 10, when the wall is made.

In this case, the lowered seatings 34, 36, 43, 45 and 47, 49 have a depth of 13 mm.

The embodiment of the lowered seatings 34, 36, 43, 45 and 47, 49 solves the problem of laying the mortar 40 and of the heat bridges that form following said laying, but without using complicated strategies as in the state of the art.

Indeed, the lowered seatings 34, 36, 43, 45 and 47, 49 completely accommodate the necessary quantity of mortar 40, without the latter overflowing laterally, and covering the visible parts of the inserts 25.

Indeed, the operator will be able to fill, quite easily, the lowered seatings 34, 36, 43, 45 and 47, 49 to the necessary level with a quantity of mortar 40 that is already the precise and predetermined amount, thanks to the depth D correlated to it, but without laying the mortar also above said lowered seatings 34, 36, 43, 45 and 47, 49.

Figure 3A:
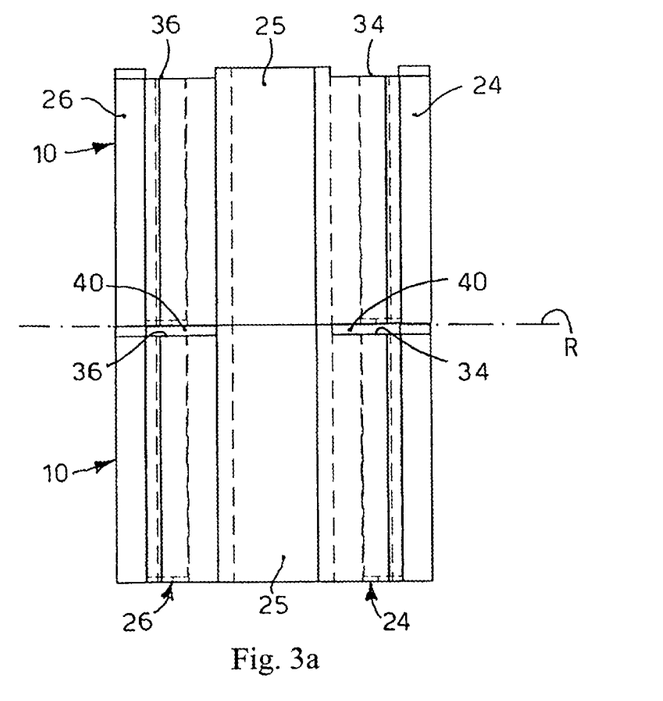
FIG. 3a is a schematic view of two combined structural elements according to the present invention.

In other words, the lowered seatings 34, 36, 43, 45 and 47, 49 act as seatings or channels to contain the mortar 40, holding it back and confining it laterally, at least on the side where there is the insert 25, but in any case allowing it to perform its proper functions as a binder element to the other elements 10 that are gradually put on top (FIGS. 3 and 3a).

In this way the mortar does not cover the inserts 25, keeps the continuity of the insulating material along the whole perimeter of the wall and prevents heat bridges from forming, due precisely to the interference of the mortar 40, which would compromise the overall value of thermal transmittance.

Thanks to this, it is certain that the block 10 satisfies the criteria of thermal transmittance as laid down by the Legislative Decree 311/06 of the Republic of Italy.

The schematic view in FIG. 3a shows the stable connection between two superimposed blocks 10.

The upper face 12 of the block 10 below allows the lower face 14 of the upper block 10 to rest upon it, on the support plane R. The stable connection is given by the layers of mortar 40 located in the seatings 34, 36 of the block 10 below. The mortar 40 cooperates only with the lower surfaces of the parts 24, 26 of the block 10 above, and does not go over the insert 25, nor is it disposed between two combined inserts 25.

Since the blocks 10 are all the same and mating, both the inserts 25 and also the parts 24, 26 cooperate only with the homologous components, inserts 25 and parts 24, 26 of the other combined blocks 10.

In FIG. 3a it can be seen how, as the blocks 10 are superimposed and combined, the mortar 40 is confined in the seatings 34, 36, and there is no unwanted physical connection or therefore any heat conduction between the two parts 24, 26 of the same block 10. Each of the parts 24, 26 is connected, by means of the mortar 40, only with respective parts 24, 26 of the other, superimposed block 10 (this also applies, in the case of lateral combination of several blocks 10, to the lateral faces 20, 22).

We shall now consider a variant embodiment of the solution where the constraint between the insert 25 and the parts 24, 26 made of conglomerate material is achieved by means of the first swallow-tailed ribs 28.

In this variant (FIGS. 5 and 6), the extension upward of the second ribs 31 may not reach the level of the support plane R. For example, the second ribs 31 may arrive just below the support plane R, for example about 3 mm.

Figure 5:
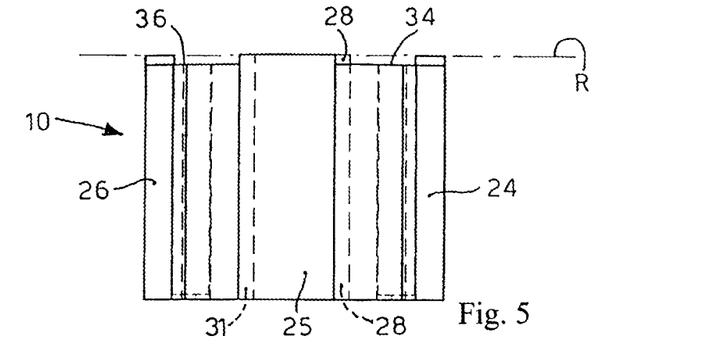
FIG. 5 is a front view of a variant of a structural element according to the present invention.
Figure 6:
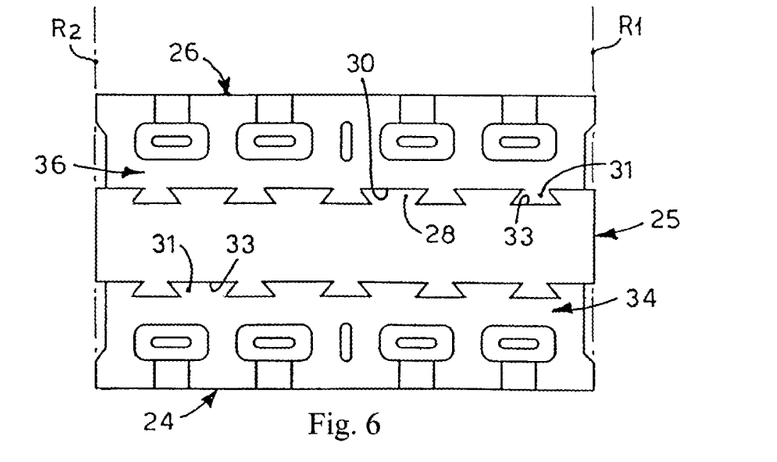
FIG. 6 is a plane view of the structural element in FIG. 5.

It may also be that the second ribs 31 reach only the level of the bottom of the seatings 34, 36 (the level of the bottom is given by the difference between the value of the height H and the depth D). In this latter solution, the seatings 34, 36 are extended in width with respect to the previous solutions and extend transversely as far as the insert 25, that is, until they comprise the space normally affected by the protruding part of the second ribs 31. In this way, the invention prevents thermal bridges due to direct contact, both upper and lateral, between the second ribs 31 of the blocks 10 superimposed or adjacent in combination with each other.

Another advantageous variant according to the present invention provides protruding teeth 38 that project from the periphery of the upper face 12, provided alternately, as can easily be seen in FIGS. 1, 3 and 4. The teeth 38 have a height equal to the value of the depth D of the seatings 34, 36, and in this way are level with the support plane R and with the insert 25.

In this variant, the weight of the superimposed blocks 10 is not concentrated only on the insert 25, as would normally happen due to the fact that it protrudes, but is distributed on the teeth 38 too, which support a part of it, having a more homogeneous support over the whole support plane R.

The teeth 38 substantially function as spacers and allow to discharge the weight better, not only on the insert 25, of the blocks 10 resting one on the other, thus distributing better the load on the upper face 12.

This is advantageous, especially during stacking in the warehouse, and prevents the inserts 25 having to support the great weight of the other blocks 10 stacked above.

Furthermore, normally, the blocks 10 can be set down on site, before and during the laying of the wall, with their upper face 12 facing down.

The presence of the teeth 38, in these situations where the block 10 must be raised by the operator, facilitates grip by the operator on the site, who can thus easily exploit hollows 51 that are created between one tooth 38 and the other.

Another advantage of the teeth 38 is that they can function as accurate reference notches when the blocks 10 are actually being laid.

Indeed, it will suffice to make the surfaces of the teeth 38 of the two blocks 10 that are to be superimposed coincide flush, in order to obtain the exact reciprocal positioning. This allows, in conclusion, a precise coincidence of the position of the inserts 25 of the superimposed blocks 10 and an overall greater accuracy in the alignment of the wall that is to be made.

The present invention also concerns a machine 110 for the production of blocks 10 as described above.

In this case, the machine 110 is of the step-wise feed type in which, after a first group of blocks 10 has been made, the machine 110 deposits these blocks 10 on the ground and is moved forward by one step.

Figure 7:
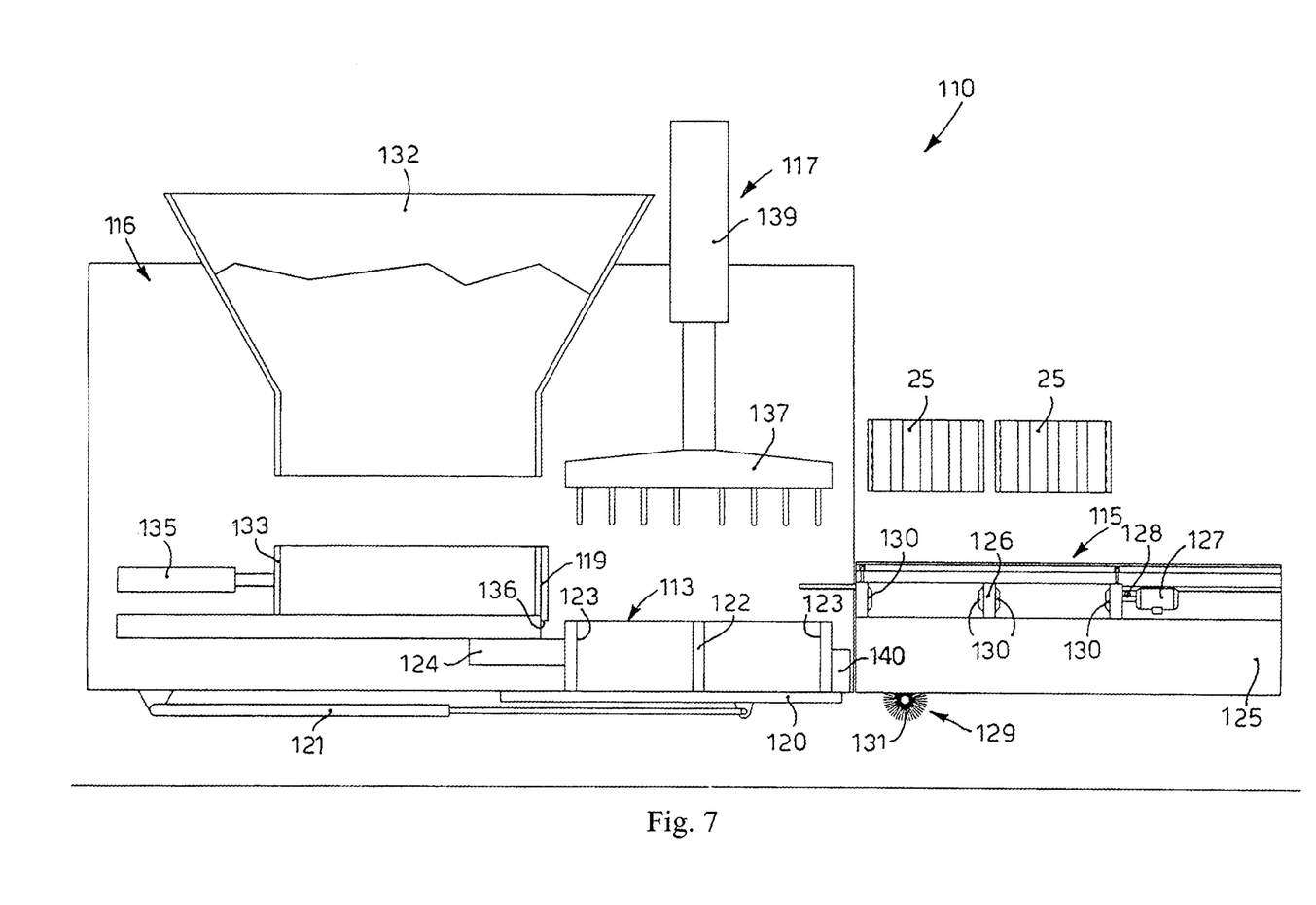
FIG. 7 shows schematically a longitudinal section of a machine for the production of structural elements for the building trade according to the present invention in a first operating condition.

The machine 110 substantially comprises (FIGS. 6 and 7) a mold 113 for molding the blocks 10, a mobile loader 115 for the inserts 25, a deposit member 116 for the conglomerate material, a thruster unit 117 for positioning the inserts 25 in the mold 113, and a level 119 for scraping the molded blocks 10.

The mold 113 is open at the upper part and can be selectively closed on the lower part by means of a plate 120 moved by means of an actuator 121.

The mold 113 comprises internally a plurality of dividing walls 122 able to define, in combination with each other, a plurality of molding sectors 123, with shapes and sizes corresponding to the blocks 10 to be made.

The mold 113 also comprises a vibration unit 124 that determines alternating oscillations of the mold 113, so as to promote the complete and uniform deposit of the conglomerate material inside the molding sectors 123, and close to the inserts 25.

The mobile loader 115 comprises a structure 125 on which are mounted a positioning tray 126, a drive member 127 and a unit 129 for the surface finishing of the molded blocks 10.

The positioning tray 126 is open both at the top and at the bottom and comprises internally a plurality of positioning elements 130 with respect to which the inserts 25 are able to be positioned so as to assume and maintain the correct loading position in the mold 113.

The positioning tray 126 is also mounted sliding with respect to the structure 125 along an upper plane with respect to the mold 113.

In particular, the positioning tray 126 is selectively movable by the drive member 127 between a first inactive position, in which it is closed at the lower part by the structure 125 and inside it the inserts 25 are positioned, by loading from above, with respect to the positioning elements 130, and a second operating position in which it is open at the lower part and is above the mold 113, so as to allow the inserts 25 to be loaded into the latter from above.

In this case, the drive member 127 provides a thrust rack 128, constrained directly to the positioning tray 126 so as to actuate the movement thereof from one of said two positions to the other.

The surface finishing unit 129 is mounted on the lower part of the structure 125 and substantially comprises a rotary brush 131, which is able to brush the upper surface of the blocks 10 made, so as to define the surface finishing thereof. The rotary brush 131 can be made substantially of any material, such as for example metal, plastic or others, having sufficient mechanical characteristics for abrading concrete and polystyrene.

The deposit member 116 comprises a hopper 132 and a mobile frame 133, and is disposed in a position substantially opposite the mobile loader 115, with respect to the mold 13.

The hopper 132 is of the substantially traditional type and will not be described in detail here.

The mobile frame 133 is substantially co-planar with the positioning tray 126 and is open both at the lower part and at the upper part.

The mobile frame 133 is selectively mobile by means of a relative actuator 135 between a first inactive position in which it is closed at the lower part and is under the hopper 132 so as to be loaded with a determinate quantity of conglomerate material, and a second operating position in which it is open at the lower part and is above the mold 113, so as to allow to deposit the conglomerate material from above into the mold 113.

In the second operating position of the mobile frame 133, the vibration unit 124 causes the mold 113 to vibrate.

The level 119 is mounted on one side of the mobile frame 133 and protrudes below it with a scraper edge 136, so as to contact the upper surfaces 27, 29 of the inserts 25 positioned in the mold 113.

Both the mold 113 and the scraper edge 13 are shaped in a manner mating with the desired shape of the lowered seatings 34, 36 and the lowered seatings 43, 45 and 47, 49 that are to be obtained above and laterally, in this case therefore with two lateral portions that extend for a length equal to the depth D, separated by a window of greater size, mating with the protrusion of the insert 25.

In this way when the mobile frame 133 is taken from its second operating position to its first inactive position, the scraper edge 136 moves in a co-planar manner above the mold 113 so as to shape the upper surfaces 27, 29 and lateral surfaces 35, 37 and 39, 41 of the blocks 10 still in the mold 113, and thus define both the lowered seatings 34, 36 and also the lowered seatings 43, 45 and 47, 49.

Advantageously, the level 119 is mounted in adjustable manner on the mobile frame 133, so as to be able to vary the operating depth thereof, according to the actual height of the inserts 25.

The thruster unit 117 is disposed above and coaxial with the mold 113 in a raised position with respect to the plane on which the positioning tray 126 and the mobile frame 133 move, so that the latter, in the respective operating positions, are positioned in height between the mold 113 and the thruster unit 117.

The thruster unit 117 comprises a comb element 137 that is movable vertically by means of a vertical actuator 139 and, when the positioning tray 126 is in its second operating position, is able to selectively thrust, from the top downward, the inserts 25 inside the respective molding sectors 123 of the mold 113.

The thruster unit 117 is also able to accompany the release movement of the blocks 10 at the end of their molding in the mold 113.

The comb element 137 of the thruster unit 117 has peripheral ends shaped mating with the shape of the protruding elements 38 that are to be made on the external edge of the upper face 12 of each block 10, so that in its movement downward, it also molds said protruding elements 38.

In this case, the machine 10 comprises a movement unit 140, only shown schematically in the drawings, which is associated with the mold 113 so as to determine the vertical movement thereof toward the ground, when the molding of the blocks 10 is finished. In this way, the blocks 10 are rested carefully on the ground, substantially without being damaged and keeping a desired orderly disposition.

The machine 110 as described heretofore functions as follows.

The initial condition (FIG. 7) of the machine 110 is with the positioning tray 126 and the mobile frame 133 in the respective first inactive positions, and the mold 113 closed at the lower part by the plate 120.

Figure 8:
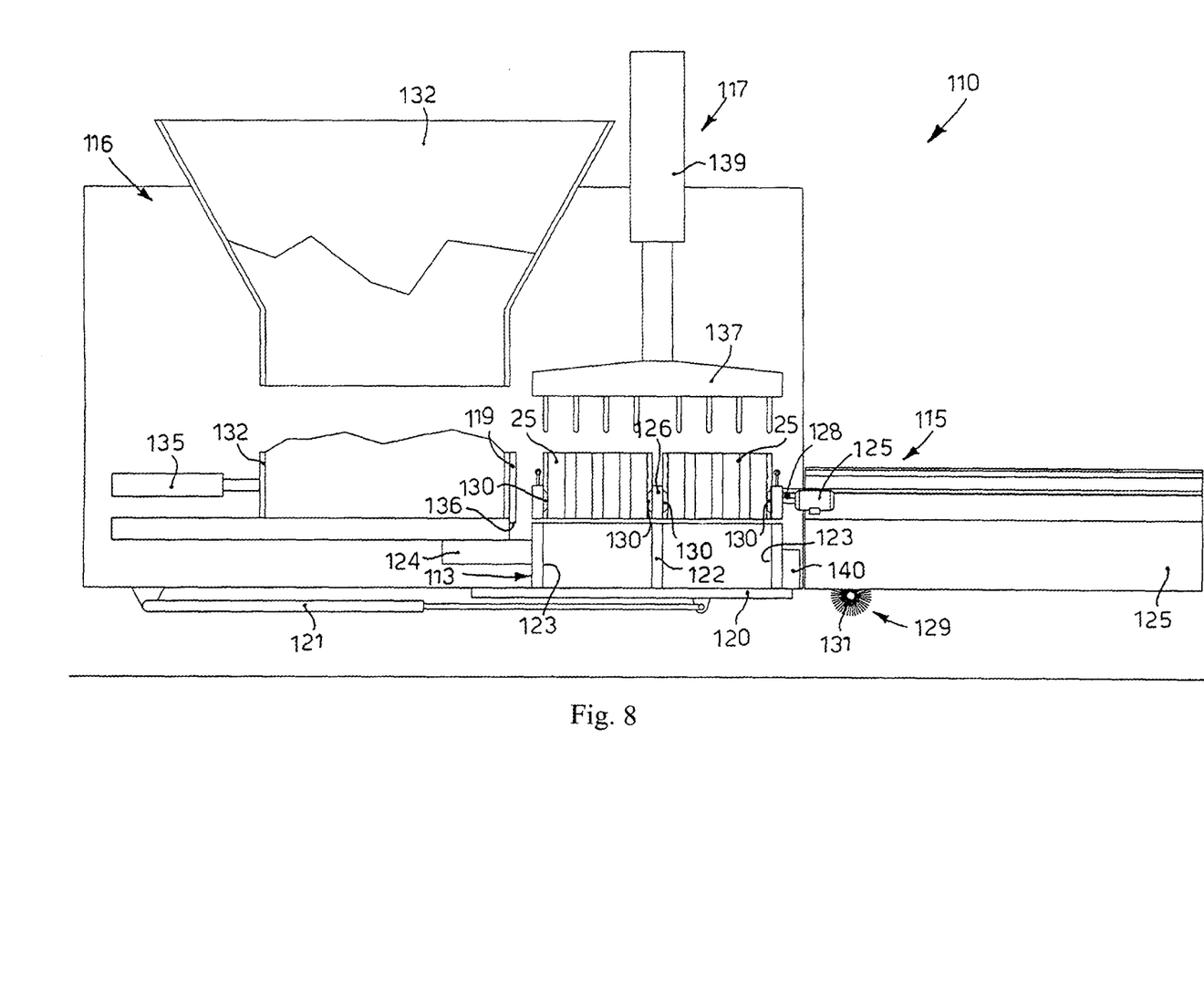
FIG. 8 shows schematically a longitudinal section of the machine in FIG. 7 in a second operating condition.

Then the inserts 25 are loaded between the positioning elements 130 of the positioning tray 126, while the hopper 132 is loaded with the conglomerate material that is then deposited in the mobile frame 133 (FIG. 8).

Subsequently, the positioning tray 126 is taken to its second operating position above the mold 113.

Figure 9:
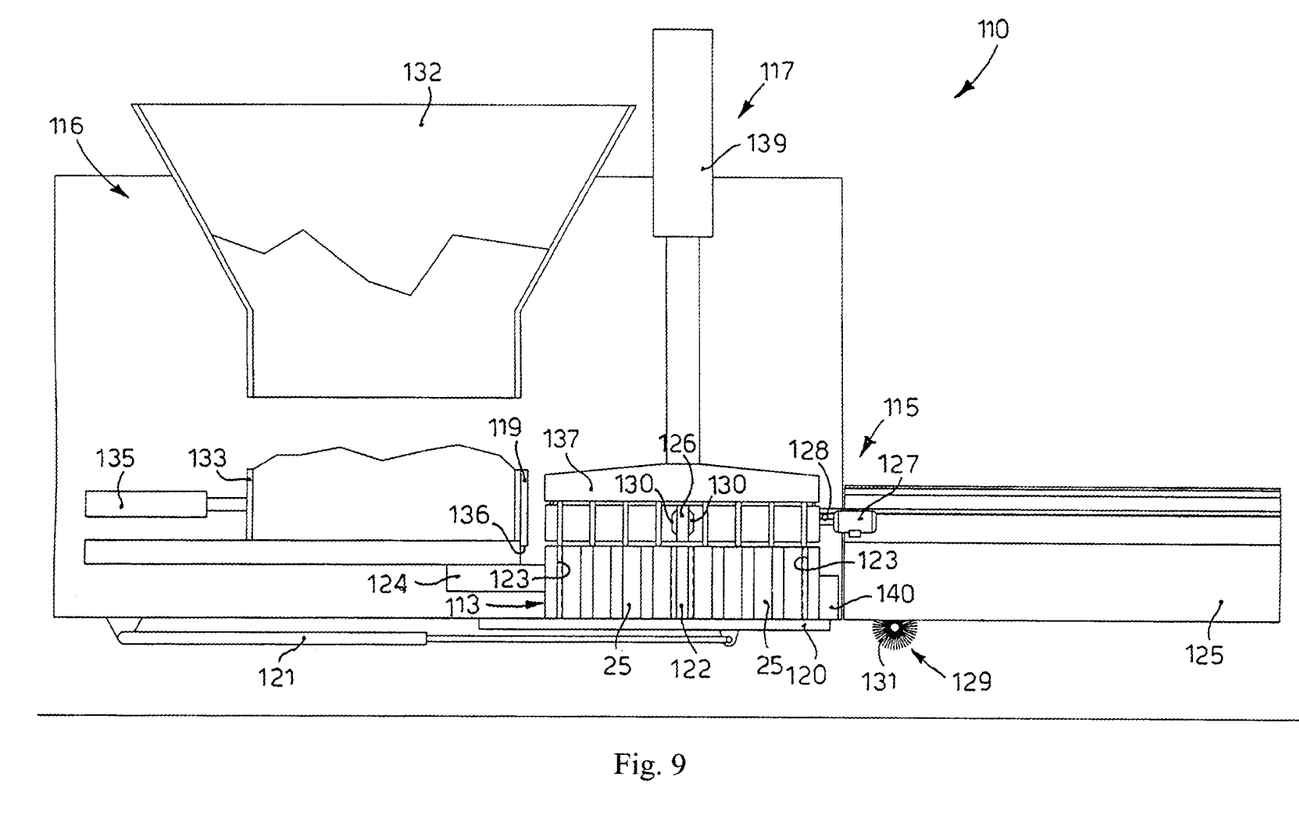
FIG. 9 shows schematically a longitudinal section of the machine in FIG. 7 in a third operating condition.

Then the thruster unit 117 is activated (FIG. 9) so that the comb element 137 pushes the blocks 10 from above downward, inserting them into the respective molding sectors 123. In this step, the thruster unit 117 also molds the protruding elements 38 on the periphery of the upper faces 12 of each block 10.

Then the positioning tray 126 is moved toward its first inactive position, and simultaneously the mobile frame 133 is moved toward its second operating position.

Figure 10:
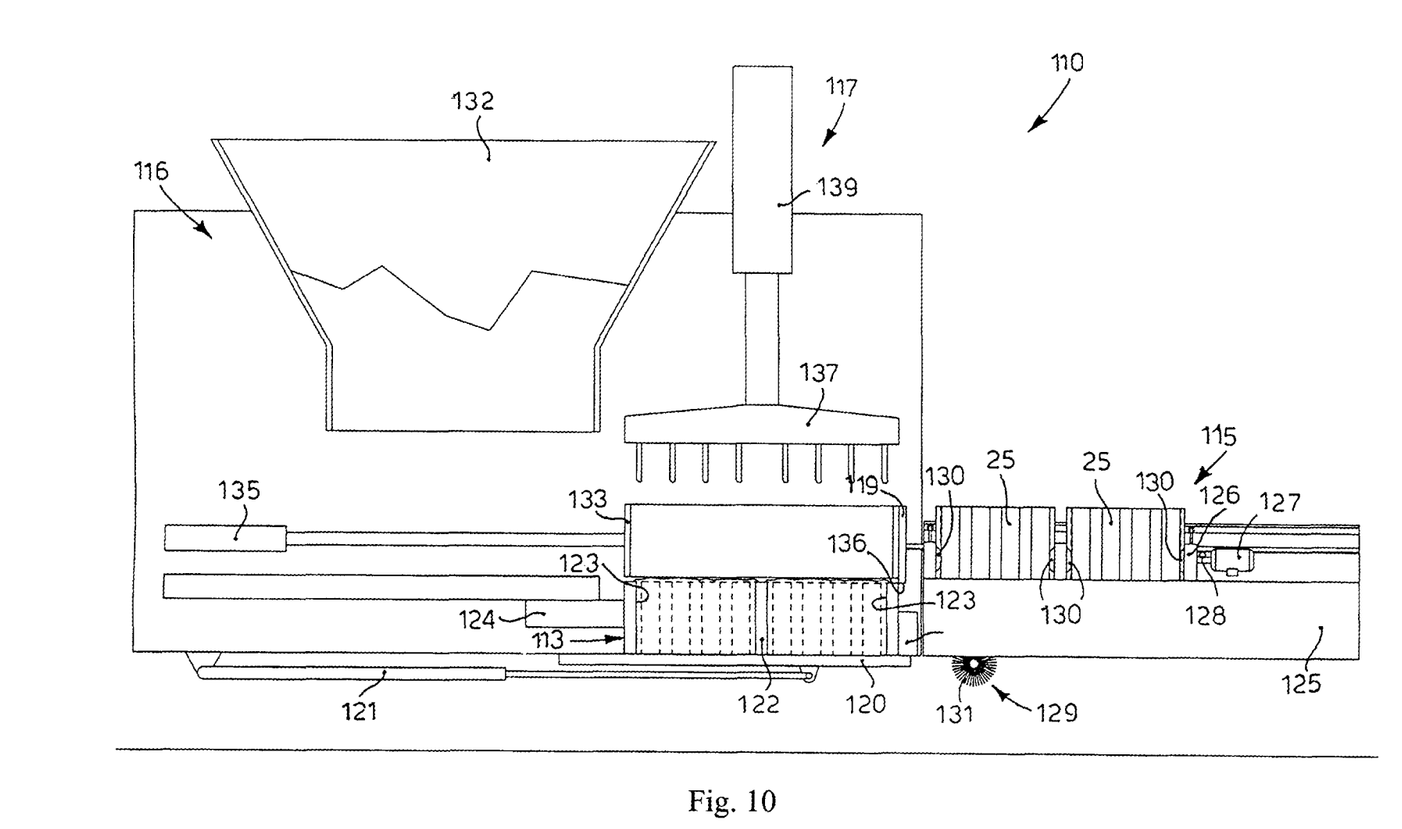
FIG. 10 shows schematically a longitudinal section of the machine in FIG. 7 in a fourth operating condition.

In this condition, the mobile frame 133 deposits the conglomerate material in the mold 113 (FIG. 10), while the positioning tray 126 is loaded with other inserts 25.

The deposit of the conglomerate material in the mold 113 is facilitated by the vibration made by the vibration unit 124, so as to promote the compacting and penetration into the interstices defined by the shape of the inserts 25.

Figure 11:
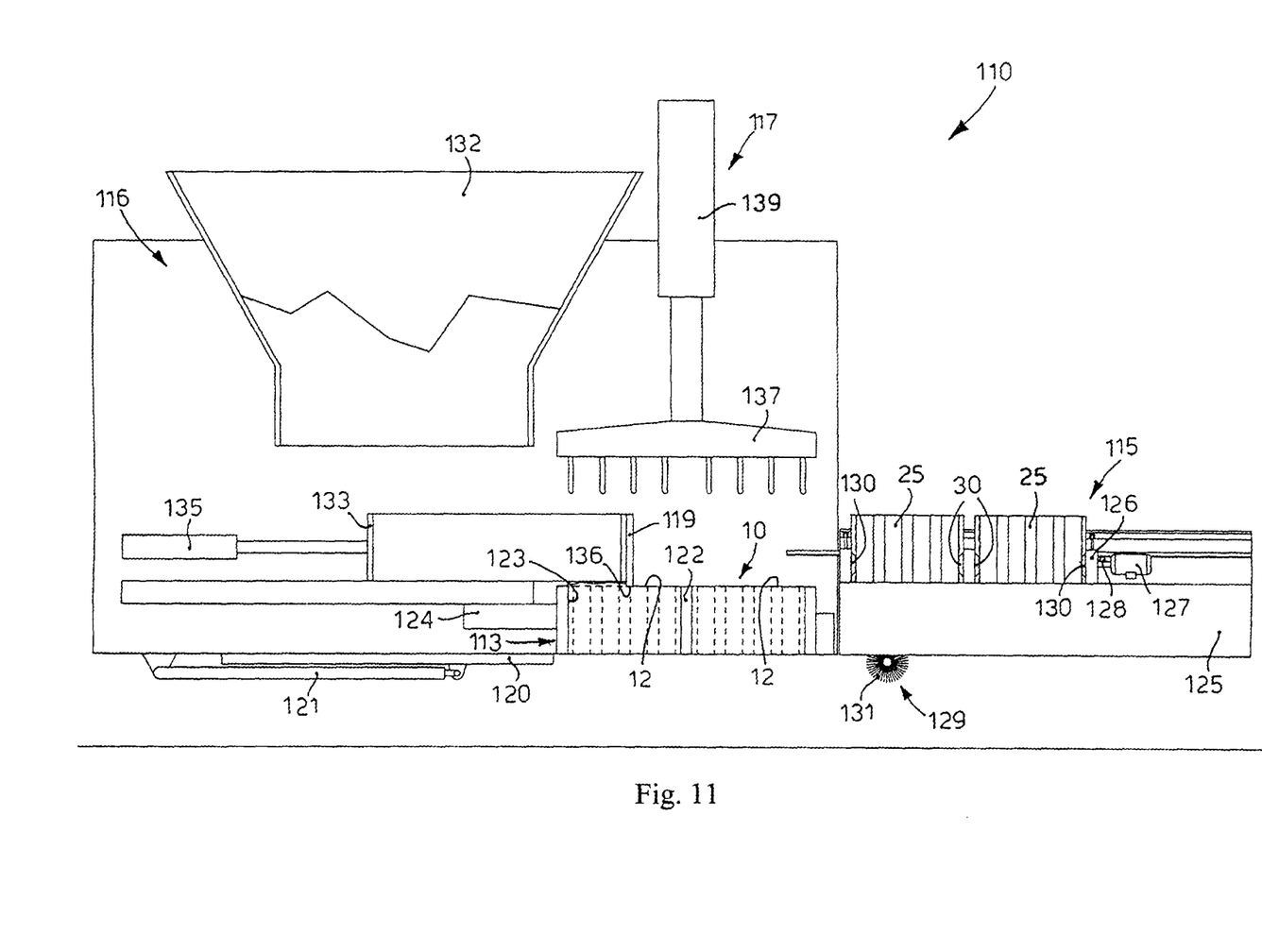
FIG. 11 shows schematically a longitudinal section of the machine in FIG. 7 in a fifth operating condition.

Then the mobile frame 133 is returned to its first inactive position. As we said, in this step the level 119 scrapes the surface of the blocks 10 in the mold 113 so as to shape the upper face 12 and the lateral faces 20, 22 (FIG. 11) and achieve both the lowered seatings 34, 36 and also the lowered seatings 43, 45 and 47, 49.

Figure 12:
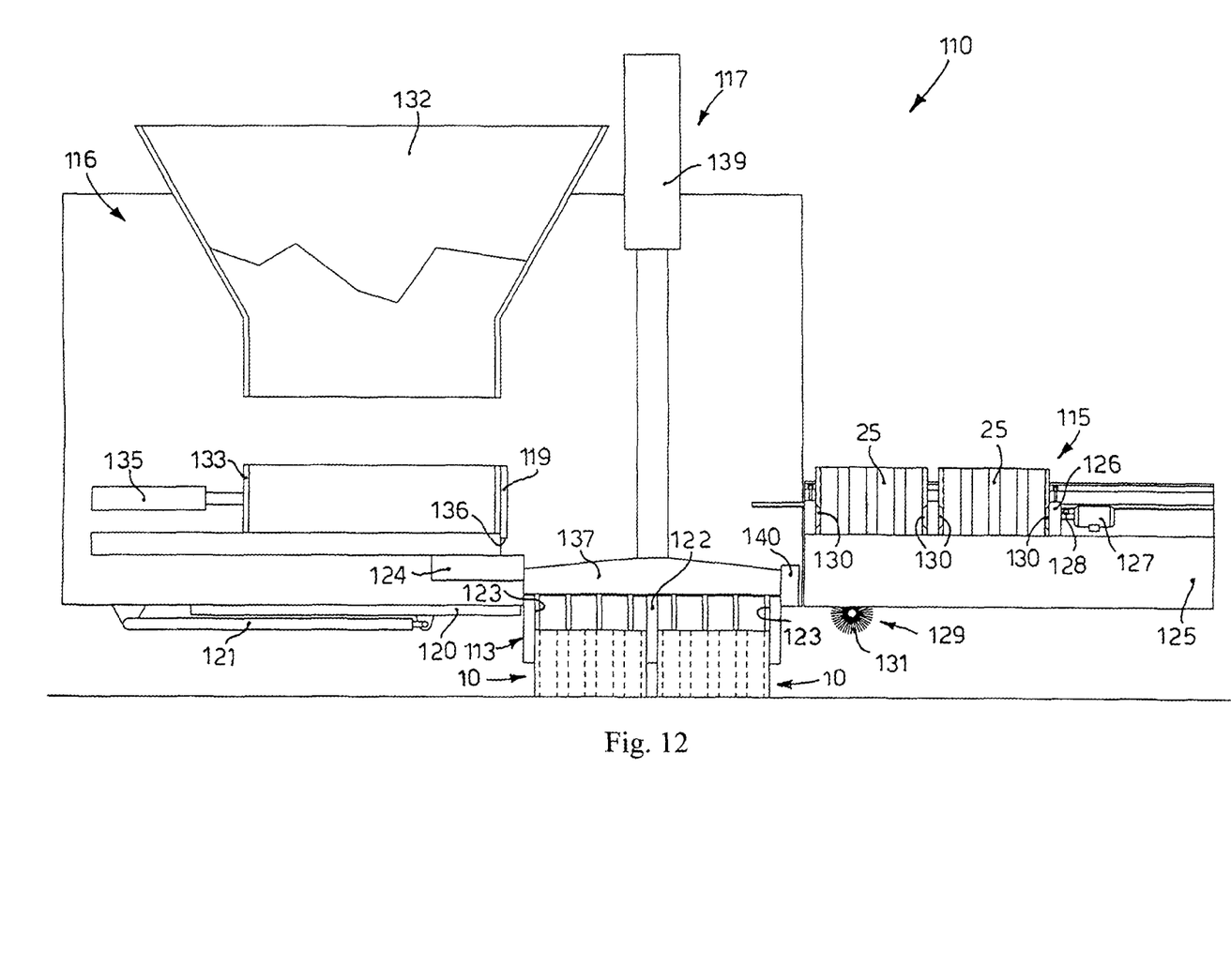
FIG. 12 shows schematically a longitudinal section of the machine in FIG. 7 in a sixth operating condition.

The mold 113 is then moved toward the ground by the movement unit 140, and the comb element 137 is lowered so as to separate the blocks 10 from the mold 13 (FIG. 12) and deposit them on the ground.

Figure 13:
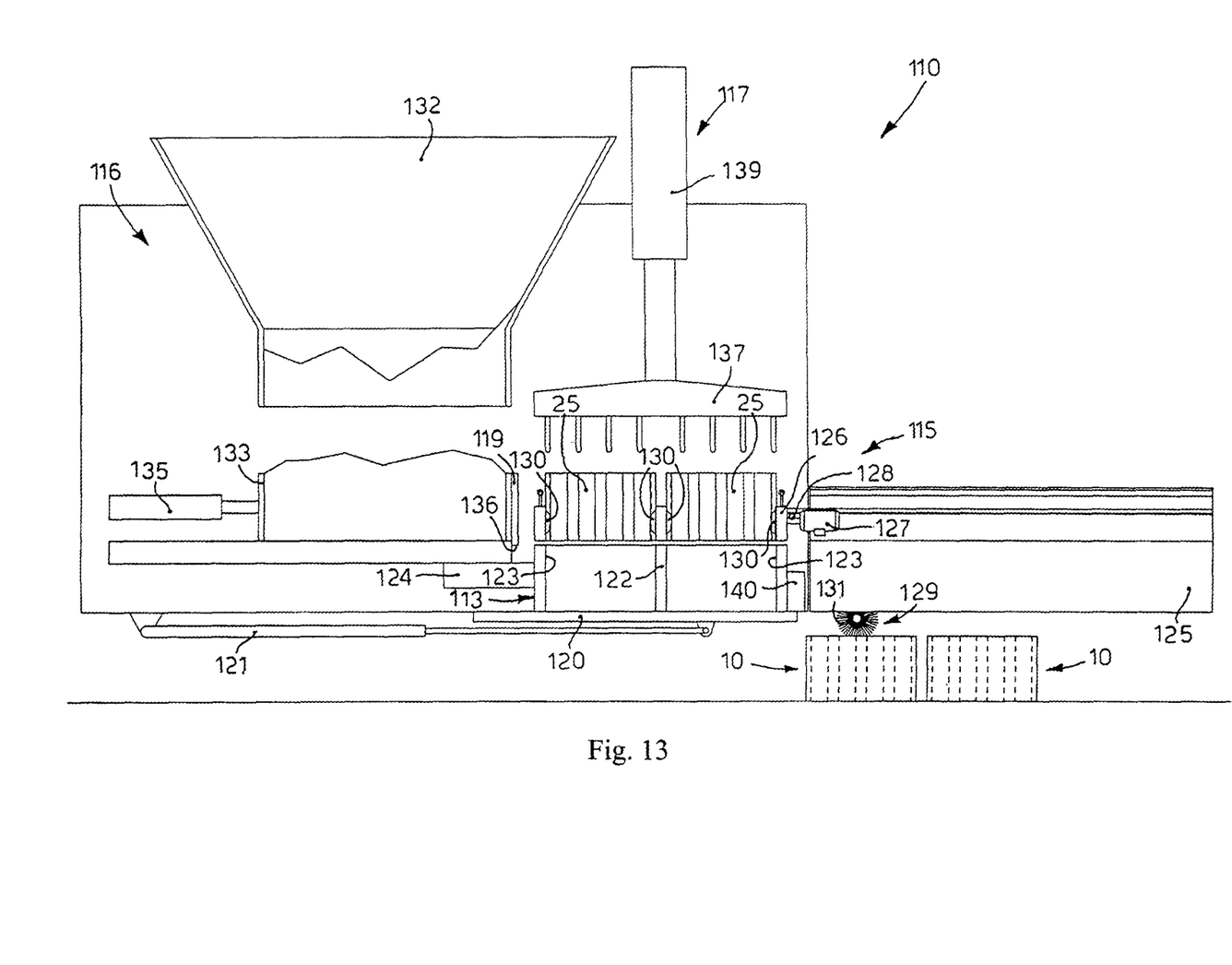
FIG. 13 shows schematically a longitudinal section of the machine in FIG. 7 in a seventh operating condition.

The machine 110 then advances by one step and the above operating cycle is repeated (FIG. 13).

During the advance of the machine 110, the blocks 10 that have just been formed are surface finished by the rotary brush 131.

It is clear that modifications and/or additions of parts and/or steps may be made to the structural element for the building trade, the machine and the method to make it as described heretofore, without departing from the field and scope of the present invention.

It is also clear that, although the present invention has been described with reference to some specific examples, a person of skill in the art shall certainly be able to achieve many other equivalent forms of structural element for the building trade, the machine and the method to make it, having the characteristics as set forth in the claims and hence all coming within the field of protection defined thereby.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A machine for the production of structural elements for use as a brick, construction block, panel, floor or suchlike in the building trade, each comprising at least a part made of conglomerate material to which an insert made of insulating or filling material is constrained, so as to define peripherally at least a connection face for connection to another structural element, said at least a connection face has visible a first surface of the insert and at least a connected second surface of said at least one part made of conglomerate material, on said at least a connection face one or more other structural elements being able to be combined, along a support plane (R, R1, R2) provided in correspondence with said at least a connection face, so as to be laid and stably connected by means of a layer of binder material, said machine comprising:
    a molding member;
    means to load said inserts;
    means to deposit said conglomerate material;
    a leveling element able to be moved on a plane above said molding member so as to act, by means of a scraper edge, on said structural elements; and
    a thruster member disposed above the molding member, wherein the molding member is open at the upper part and said means to load said inserts and said means to deposit said conglomerate material are selectively positionable above said molding member so as to load and deposit from above, respectively, said inserts and said conglomerate material into said molding member, so as to make said structural elements,
    wherein the molding member and the scraper edge are shaped and configured so as to define, on said second surface, a seating made longitudinally and lowered with respect to the support plane (R, R1, R2), and
    wherein the thruster member is configured to thrust said inserts from above downward from the means to load said inserts, into said molding member, said thruster member having a comb element which is shaped and configured so as to mold, in the movement downward of the thruster member, protruding elements made on the second surfaces of the parts made of conglomerate material, in correspondence with the periphery or external edge of the at least a connection face, which have a height such as to be level with the support plane (R).

2. The machine according to claim 1, wherein the layer of binder material is laid on said seating, said seating having a determinate depth (D) with respect to the support plane (R, R1, R2), said depth (D) being correlated to the predefined thickness of the layer of binder material.

3. The machine according to claim 1, the machine being of the step-wise feed type in which, after a first group of structural elements has been made, the machine is configured to deposit the structural elements on the ground and is moved forward by one step.

4. The machine according to claim 1, wherein the means to load said inserts for the inserts comprises a mobile loading member.

5. The machine according to claim 1, wherein the molding member open at the upper part can be selectively closed on the lower part by a plate moved by an actuator.

6. The machine according to claim 1, wherein the molding member comprises internally a plurality of dividing walls to define, in combination with each other, a plurality of molding sectors, with shapes and sizes corresponding to the structural elements to be made.

7. The machine according to claim 6, wherein the molding member comprises a vibration unit configured to determine alternating oscillations of the molding member, so as to promote the complete and uniform deposit of the conglomerate material inside the molding sectors, and close to the inserts.

8. The machine according to claim 4, wherein the mobile loading member comprises a loading structure on which are mounted a positioning tray, a drive member and a unit for the surface finishing of the molded structural elements.

9. The machine according to claim 8, wherein the positioning tray is open both at the top and at the bottom and comprises internally a plurality of positioning elements with respect to which the inserts are able to be positioned so as to assume and maintain the correct loading position in the molding member.

10. The machine according to claim 8, wherein the positioning tray is mounted sliding with respect to the loading structure along an upper plane with respect to the molding member.

11. The machine according to claim 9, wherein the positioning tray is selectively movable by the drive member between a first inactive position, in which it is closed at the lower part by the loading structure and inside it the inserts are positioned, by loading from above, with respect to the plurality of positioning elements, and a second operating position in which it is open at the lower part and is above the molding member, so as to allow the inserts to be loaded into the latter from above.

12. The machine according to claim 11, wherein the drive member provides a thrust rack constrained directly to the positioning tray so as to actuate the movement thereof from one of said first inactive and second operating positions to the other of said first inactive and second operating positions.

13. The machine according to claim 8, wherein the surface finishing unit is mounted on the lower part of the loading structure and comprises a rotary brush, configured to brush the upper surface of the structural elements made, so as to define the surface finishing thereof.

14. The machine according to claim 1, wherein said means to deposit said conglomerate material comprises a deposit member provided with a hopper and a mobile frame, and is disposed in a position substantially opposite the means to load said inserts, with respect to the molding member.

15. The machine according to claim 14, wherein the means to load said inserts comprises a loading structure on which is mounted a positioning tray, the mobile frame being essentially co-planar with the positioning tray and being open both at the lower part and at the upper part.

16. The machine according to claim 14, wherein the mobile frame is selectively mobile by an actuator between a first inactive position in which it is closed at the lower part and is under the hopper so as to be loaded with a determinate quantity of conglomerate material, and a second operating position in which it is open at the lower part and is above the molding member, so as to allow to deposit the conglomerate material from above into the molding member.

17. The machine according to claim 7, wherein, in the second operating position of the mobile frame, the vibration unit is configured to cause the molding member to vibrate.

18. The machine according to claim 14, wherein the leveling element is mounted on one side of the mobile frame and protrudes below it with the scraper edge, so as to contact upper surfaces of the inserts positioned in the molding member.

19. The machine according to claim 18, wherein both the molding member and the scraper edge are shaped in a manner mating with the desired shape of the lowered seatings of the structural elements.

20. The machine according to claim 18, wherein the level is mounted in adjustable manner on the mobile frame, so as to be able to vary the operating depth thereof, according to the actual height of the inserts.

21. The machine according to claim 15, the machine comprising a thruster member disposed above the molding member and able to thrust said inserts from above downward from the means to load said inserts, into said molding member, said thruster member having a comb element which is shaped and configured so as to mold, in the movement downward of the thruster member, protruding elements made on the second surfaces of the parts made of conglomerate material, in correspondence with the periphery or external edge of the at least a connection face, which have a height such as to be level with the support plane (R), the thruster member being disposed coaxial with the molding member in a raised position with respect to the plane on which the positioning tray and the mobile frame move, so that the latter, in the respective operating positions, are positioned in height between the molding member and the thruster unit.

22. The machine according to claim 11, wherein the comb element is movable vertically by a vertical actuator and, when the positioning tray is in its second operating position, is able to selectively thrust, from the top downward, the inserts inside respective molding sectors of the molding member.

23. The machine according to claim 1, wherein the thruster member is configured to accompany the release movement of the structural elements at the end of their molding in the molding member.

24. The machine according to claim 1, wherein the comb element has peripheral ends shaped mating with the shape of the protruding elements that are to be made on the external edge of the upper face of each structural elements, so that in its movement downward, it also molds said protruding elements.

25. The machine according to claim 1, the machine comprising a movement unit associated with the molding member so as to determine the vertical movement thereof toward the ground, when the molding of the construction block is finished.

26. A machine for the production of structural elements for use as a brick, construction block, panel, floor or suchlike in the building trade, each comprising at least a part made of conglomerate material, to which an insert made of insulating or filling material is constrained, so as to define peripherally at least a connection face for connection to another structural element, said at least a connection face has visible a first surface of the insert and at least a connected second surface of said at least one part made of conglomerate material, on said at least a connection face one or more other structural elements being able to be combined, along a support plane (R, R1, R2) provided in correspondence with said at least a connection face, so as to be laid and stably connected by means of a layer of binder material, said machine comprising:
  a molding member;
  means to load said inserts comprising a mobile loading member, the mobile loading member comprising a loading structure on which are mounted a positioning tray, a drive member and a unit for the surface finishing of the molded structural elements;
  means to deposit said conglomerate material;
  a leveling element able to be moved on a plane above said molding member so as to act, by means of a scraper edge, on said structural elements; and
  wherein the molding member is open at the upper part and said means to load said inserts and said means to deposit said conglomerate material are selectively positionable above said molding member so as to load and deposit from above, respectively, said inserts and said conglomerate material into said molding member, so as to make said structural elements,
  wherein the molding member and the scraper edge are shaped and configured so as to define, on said second surface, a seating made longitudinally and lowered with respect to the support plane (R, R1, R2).

27. A machine for the production of structural elements for use as a brick, construction block, panel, floor or suchlike in the building trade, each comprising at least a part made of conglomerate material, to which an insert made of insulating or filling material is constrained, so as to define peripherally at least a connection face for connection to another structural element, said at least a connection face has visible a first surface of the insert and at least a connected second surface of said at least one part made of conglomerate material, on said at least a connection face one or more other structural elements being able to be combined, along a support plane (R, R1, R2) provided in correspondence with said at least a connection face, so as to be laid and stably connected by means of a layer of binder material, said machine comprising:
- a molding member;
- means to load said inserts;
- means to deposit said conglomerate material comprising a deposit member provided with a hopper and a mobile frame, the means to deposit said conglomerate material being disposed in a position substantially opposite the means to load said inserts, with respect to the molding member;
- a leveling element able to be moved on a plane above said molding member so as to act, by means of a scraper edge, on said structural elements; and
- wherein the molding member is open at the upper part and said means to load said inserts and said means to deposit said conglomerate material are selectively positionable above said molding member so as to load and deposit from above, respectively, said inserts and said conglomerate material into said molding member, so as to make said structural elements,
- wherein the molding member and the scraper edge are shaped and configured so as to define, on said second surface, a seating made longitudinally and lowered with respect to the support plane (R, R1, R2).

* * * * *